United States Patent [19]

Sheets, Jr. et al.

[11] 3,770,401

[45] Nov. 6, 1973

[54] PHOSPHATE-BONDED GRINDING WHEEL

[75] Inventors: Herbert D. Sheets, Jr., Columbus, Ohio; Ronald A. Meyer, Beloit, Wis.; Martin J. O'Hara, Columbus, Ohio

[73] Assignee: Litton Industries, Inc., Beverly Hills, Calif.

[22] Filed: Apr. 5, 1971

[21] Appl. No.: 131,435

[52] U.S. Cl. .................................... 51/308, 51/309
[51] Int. Cl. ............................ B24d 3/02, C09c 1/68
[58] Field of Search ...................... 51/295, 298, 307, 51/308, 309

[56] References Cited
UNITED STATES PATENTS

| 2,880,081 | 3/1959 | Eubank | 51/308 |
| 2,541,658 | 2/1951 | Masin et al. | 51/308 |
| 3,071,456 | 1/1963 | Cheesman | 51/307 |

Primary Examiner—Donald J. Arnold
Attorney—Joseph R. Spalla

[57] ABSTRACT

An abrasive body of grit-size particles of alumina or silicon carbide held together by a water-insoluble aluminum phosphate bonding matrix, which body is of increased strength through its phosphate bonding matrix containing a small amount of at least one or both of particlate aluminum and an in-situ formed phosphosilicate; and an improved molding composition for preparing the abrasive body, which molding composition contains up to 12 percent by weight thereof of particulate aluminum of minus 200 mesh size and/or sodium silicate having a $SiO_2$ to $Na_2O$ weight ratio greater than 1 and less than 3.8.

12 Claims, No Drawings

PHOSPHATE-BONDED GRINDING WHEEL

This invention relates to strength improvement of an abrasive body held together by a water-insoluble phosphate binder. More particularly the invention concerns (a) an improved molding composition containing a small amount of at least one strength-promoting agent selected from the group consisting of particulate aluminum of fine size and sodium silicate of moderate to high $SiO_2$ to $Na_2O$ weight ratio, and (b) an improved abrasive body of superior strength prepared from the molding composition.

In a commonly owned copending allowed application entitled "Phosphate Bonded Gridning Wheel," Serial No. 768,184, filed Oct. 16, 1969, now U.S. Pat. No. 3,619,151, issued November 9, 1971, there are disclosed a phosphate-bonded abrasive body, and a molding composition for its preparation, of the particular nature and type for which the present invention provides significant improvements thereover by employing therein certain specific strength-promoting agents. This disclosure incorporates from some to all portions of the afore-identified application as are of interest and concern to supplement, complete, and further disclose the present invention.

Thus, in conjunction with teachings herein and those of the afore-identified application, it should be apparent that abrasive bodies comprise abrasive grit particles held together by a binder or matrix of another material with these abrasive bodies in the form of grinding wheels, coated surfaces, abrasive tips and/or tool inserts being of utility for removing material, deburring, grinding, smoothing, polishing, and like operations for preparing useful articles.

As taught in the afore-identified application, its phosphate-bonded abrasive bodies are of the following formulation:

ABRASIVE BODY COMPOSITION*

|  | Generally Useful** | Preferred** |
|---|---|---|
| Abrasive Grit | 30–60 | 45–56 |
| Phosphate Bonding Matrix | At least 8 and up to balance | 20–28 |
| Voids | Up to 45 | Balance |
| Other (e.g., Fillers, etc.) | 0–45 | 0–10 |
| To Total | 100 | 100 |

* Of the afore-identified U.S. Ser. No. 768,184
** Percent by volume

The afore-identified application also teaches its mixed cohesive molding compositions most generally useful and particularly preferred for preparing its useful abrasive bodies are of the following formulations:

MOLDING COMPOSITION FORMULATIONS*

|  | TJ Generally Useful** | Preferred** |
|---|---|---|
| Abrasive Grit | 90–30 | 62–78 |
| Phosphoric Acid | 3–21 | 11–6 |
| –325 mesh Alumina Particles | 6–46 | 25–15 |
| Finely divided Ferric Oxide | 0.4 up to about one-third of the –325 mesh alumina particles | 2–1 of –3 micron size particles |
| Other (e.g., Fillers, etc.) | 0–10 | 0–5 |
| To Total | 100 | 100 |

* Of the above-identified U.S. Ser. No. 768,184
** Parts by weight

The afore-identified application further teaches: its molding compositions contain an abrasive selected from the group of abrasive materials consisting of synthetic and natural aluminum oxides (alumina) and silicon carbide; the abrasive is employed in the form of grit particles of that size grade or gradations requisite for the particularly intended application of the abrasive body being prepared therefrom; and specific and particularly useful abrasive particle grit sizes for employment in preparing abrasive bodies which are a grinding wheel and lapping and polishing wheels. Additionally taught in the afore-identified application as essential constituents, for providing the phosphate bonding matrix for the abrasive grit particles in the abrasive body, are phosphoric acid, fine alumina particles, and finely divided ferric oxide ($Fe_2O_3$) and useful amounts of those constituents. The afore-identified application teaches those essential constituents as follows:

"The term 'phosphoric acid' as used herein is intended to encompass and include (a) orthophosphoric acid, (b) mixtures containing at least 40 percent by weight of orthophosphoric acid with pyrophosphoric acid, tripolyphosphoric acid, and other like higher polymeric phosphoric acids, and (c) aqueous solutions of (a) and (b) of limited free water content. The useful aqueous solutions, employed in the molding composition, should be of a low free water content and a high enough phosphoric acid concentration that in their employed amount the free water therein constitutes less than about 3 percent by weight of the molding composition formulation.

The fine alumina particles employed in the formulation generally are of a particle size of less than –325 mesh (U.S. Sieve Series). The employed ferric oxide is finely divided and most desirably of a particle size of less than about 3 microns. When employing the minimum amount, an extremely small portion thereof, up to about 5 percent of the minimum amount can be of larger particle sizes, and when employing amounts greater than the minimum amount larger porportions can be of particles greater than 3 microns."

Additionally the afore-identified application teaches its "useful molding composition on an optional basis may include up to several percent, to about 5 percent, by weight of an inorganic filler material, such as expanded perlite (sodium potassium aluminum silicate), asbestos fibers, and the like as well as up to several percent by weight of ceramic bond strengthening agents, wetting and/or dispersing agents, and other materials as will be obvious to those in the art."

It now has been discovered that the phosphate-bonded abrasive body taught in the afore-identified application is significantly improved and is provided with a significantly higher and superior strength through including in the molding composition from which it is prepared an effective yet small amount of at least one strength-promoting agent selected from the group consisting of a fine-size particulate aluminum and sodium silicate of moderate to high $SiO_2$ to $Na_2O$ weight ratio. Although the afore-identified application teaches that its molding composition on an optional basis may include "up to several percent by weight of ceramic bond strengthening agents," it is believed to be hitherto unknown and unobvious that fine particulate aluminum and certain sodium silicates each intentionally included separately and together in small amount (a) function as significant bond-strengthening agents in molding compositions for preparing aluminum phosphate-bonded abrasive bodies, and (b) provide abrasive bodies whose aluminum phosphate bonding matrix contains a small content of particulate aluminum and/or in-situ formed phospho-silicate, included separately or together as the case may be depending on the particularly employed molding composition, and whose strength is vastly superior to like prepared abrasive bodies lacking that small content.

The present invention includes a mixed cohesive molding composition for cold-pressing and subsequent heat-curing to become an article containing abrasive grit particles held together by a water-insoluble phosphate binder, which molding composition is of the following most generally useful and preferred formulations:

IMPROVED MOLDING COMPOSITION FORMULATION

| | Generally Useful* | Preferred* |
|---|---|---|
| Abrasive Grit (Silicon Carbide or Alumina) | 90–30 | 62–78 |
| Phosphoric Acid | 3–21 | 11–6 |
| –325 Mesh Alumina Particles | 6–46 | 25–15 |
| Finely Divided Ferric Oxide | 0.4 up to about one-third of the –325 mesh alumina particles | 2–1 of –3 micron size particles |
| Strength-Promoting Agent (Particulate aluminum of –200 mesh size, or sodium silicate having a $SiO_2$ to $Na_2O$ weight ratio greater than 1 and less than 3.8, or both) | effective amount to 12 | 4 to 2½ |
| Other (e.g., Fillers) | 0–10 | 0–5 |
| To Total | 100 | 100 |

* Parts by weight

The present invention also includes an abrasive body prepared from the foregoing improved molding compositions, which abrasive body in general is non-distinguishable exteriorly by eye from the abrasive body of the afore-identified application. It comprises the same abrasive body composition of the afore-identified application except (a) it includes in its aluminum phosphate matrix a minor amount of up to 10 percent by volume of at least one or of both of particulate aluminum of less than 200 mesh size and in in-situ formed phospho-silicate, and (b) it possesses a significantly greater strength than the abrasive body of the afore-identified application.

By the present invention providing an abrasive body of significantly improved strength there accrues the following important advantages:

a. the wheel is capable of being used at higher speed and still can withstand centrifugal forces without spalling;

b. advantageously smaller amounts and proportions of this invention's phosphate bonding matrix can provide abrasive bodies having strengths heretofore only obtainable with larger amounts and proportions of the heretofore phosphate bonding matrix. They The particulate aluminum useful as a strength-promoting agent in the invention are particles of aluminum metal. Useful aluminum metal particles may be rough or smooth surfaced and regular or irregular in shape and size, as desired. They may be prepared by any known procedure, such as comminution of massive size aluminum metal to the requisite particle size. The particulate aluminum employed should be of a fine size and of a size less than 200 mesh Larger particles of particulate aluminum are not useful in that they react more slowly with the phosphoric acid. Most generally one utilizes particulate aluminum metal of between –200 mesh and +325 mesh size.

The sodium silicate useful as a strength-promoting agent in the invention are the sodium salts or esters of silicic acid. They commonly are known as water glass or soluble glass. The invention utilizes sodium silicates of moderate to high $SiO_2$ to $Na_2O$ weight ratio. The more strongly alkaline silicates are known to be more easily water-solubilized and are detrimental to obtaining an abrasive article non-degradable by water and the like coolants, should a residue of the more strongly alkaline silicate remain in unreacted form in the aluminum phosphate matrix of the article. Most generally the employed sodium silicate has a $SiO_2$ to $Na_2O$ weight ratio greater than 1.0 and less than 3.8, and most preferably of a weight ratio between 2.0 and 3.3. The sodium silicate is utilized in its hydrated form and most generally of a concentration between 2.0 and 3.0 Baume 20° for mixing with the abrasive grit.

The strength-promoting agent is utilized in an effective amount to provide the abrasive article with significantly increased strength. Some increased strength is noted in the article upon utilizing an effective amount as low as 0.1 part by weight thereof in each 100 parts by weight of the molding composition from which the article is prepared. Most generally, however, and to provide a significant strength improvement, one includes between 0.3 and 12 parts of the strength-promoting agent per 100 parts by weight of the molding composition, and preferably includes between 2.5 and 4 parts by weight. It will be noted from the specific examples, presented later, that in general the article's strength increases as the amount utilized of the agent is increased. Amounts of the strength-promoting agent above about 12 parts in 100 parts of the molding composition generally are no more effective, and may lesson grinding efficiency. The strength-promoting agent can be either the particulate aluminum, or the sodium silicate, or both may be included.

As will be apparent from what follows, the mixed cohesive compositions of the invention are prepared by a procedure closely alike that taught in the aforeidentified application for preparing its molding composition except for modification of that procedure to provide for incorporating the strength-promoting agent in the composition's formulation. In general, the molding compositions of the aforeidentified application are prepared: by muller-mixing or the like mixing of the finely divided ferric oxide and the fine alumina particles together to provide a thoroughly mixed blend of mixed oxide fine particles; the abrasive grit particles and phosphoric acid also are mixed and blended together until the surfaces of the grit particles are wetted by the phosphoric acid, such as by mixing together for several minutes by a rapidly moving, bladed-cage mixer or the like; and then the two prepared blends are mixed thoroughly together.

To prepare the molding composition of the invention, the foregoing procedure is modified as follows: when the employed strength-promoting agent is sodium silicate, a hydrated form of the sodium silicate is mixed and blended with the abrasive grit and then, in most instances, this blend dried or otherwise treated to remove a large portion of the water from the employed sodium silicate solution prior to mixing the abrasive grit/sodium silicate blend with the phosphoric acid and proceeding with balance of the foregoing preparation procedure. The sodium silicate is utilized in a hydrated form so as to facilitate a thorough wetting of the abrasive grit particles. Although not always necessary (depending on type and amount of sodium silicate), water is removed from the applied sodium silicate solution, after it has been applied to the abrasive grit, to avoid exothermic heating upon a blending of the phosphoric acid. This water removal need not be a complete removal of all water. Generally it is accomplished by drying at moderate temperatures and by any of numerous techniques for water removal such as are illustrated in the specific examples. When the employed strength-promoting agent is the particulate aluminum, it may be incorporated in the molding composition in any of several manners. In one procedure, the particulate alumina is blended with the finely divided ferric oxide and fine alumina particles to provide a mixed oxide blend containing the particulate alumina blended therewith with in other respects the foregoing preparation procedure followed. In an alternative procedure, the foregoing preparation procedure is followed and, after its two prepared blends have been mixed thoroughly together, one adds and blends therewith the particulate aluminum. When the strength-promoting agent to be included in the molding composition is to be both the particulate aluminum and the sodium silicate, then a combination of the above procedures are followed with the sodium silicate being blended with the abrasive grit prior to blending therewith the phosphoric acid and with the particulate aluminum being blended into the mixed oxide blend or blended into the molding composition last, as desired.

The invention now is described further by presenting specific illustrative embodiments, or examples, of this invention's molding composition containing the strength-promoting agent, and for comparison purposes of like molding compositions lacking the strength-promoting agent. Each of these molding composition formulations is prepared by those procedures just described. In the following Table I, the number-identified formulations are comparison formulations according to the teachings of the aforeidentified application, and the letter-identified formulations are examples of the improved molding composition formulation of the invention.

TABLE I.—MOLDING COMPOSITION FORMULATIONS [a]

| Formulation identification | 1 | A | B | C | 2 | D | E | F | 3 | G | H | 4 | I |
|---|---|---|---|---|---|---|---|---|---|---|---|---|---|
| Abrasive/phosphoric acid blend: | | | | | | | | | | | | | |
| No. 60-grit size silicon carbide | 66.70 | 66.25 | 67.40 | 67.00 | | | | | | | | | |
| No. 60-grit size alumina | | | | | 71.24 | 70.85 | 71.92 | 71.54 | | | | | |
| No. 320-grit size silicon carbide | | | | | | | | | 71.35 | 69.58 | 71.64 | | |
| No. 320-grit size alumina | | | | | | | | | | | | 76.36 | 77.53 |
| Phospholeum [b] | 6.65 | 6.62 | 6.74 | 6.67 | 5.76 | 5.71 | 5.80 | 5.75 | 9.05 | 8.83 | 7.07 | 6.56 | 6.68 |
| Mixed oxide blend: | | | | | | | | | | | | | |
| −325 mesh alumina particles | 25.29 | 25.12 | 22.36 | 22.20 | 21.82 | 21.70 | 19.28 | 19.15 | 18.60 | 18.16 | 15.89 | 16.22 | 13.37 |
| Finely divided ferric oxide (less than 2 micron size) | 1.36 | 1.35 | 1.22 | 1.20 | 1.18 | 1.17 | 1.04 | 1.03 | 1.00 | 0.98 | 0.86 | 0.86 | 0.72 |
| Strength-promoting agent: | | | | | | | | | | | | | |
| Particulate aluminum [c] | | | 2.28 | 2.26 | | | 1.96 | 1.95 | | | 2.02 | | 1.70 |
| Sodium silicate [d] | | 0.66 | | 0.67 | | 0.57 | | 0.58 | | 2.45 | 2.52 | | |
| Total | 100.00 | 100.00 | 100.00 | 100.00 | 100.00 | 100.00 | 100.00 | 100.00 | 100.00 | 100.00 | 100.00 | 100.00 | 100.00 |

TABLE I.—Continued

| Formulation identification | 5 | J | K | L | M | N | O | 6 | P | Q | R | S | T |
|---|---|---|---|---|---|---|---|---|---|---|---|---|---|
| Abrasive/phosphoric acid blend: | | | | | | | | | | | | | |
| No. 60-grit size silicon carbide | 68.48 | 68.48 | 68.48 | 68.48 | 68.48 | 68.48 | 68.48 | 62.14 | 62.14 | 62.14 | 62.14 | 62.14 | 62.14 |
| No. 60-grit size alumina | | | | | | | | | | | | | |
| No. 320-grit size silicon carbide | | | | | | | | | | | | | |
| No. 320-grit size alumina | | | | | | | | | | | | | |
| Phospholeum [b] | 6.52 | 6.52 | 6.52 | 6.52 | 6.52 | 6.52 | 6.52 | 8.04 | 8.04 | 8.04 | 8.04 | 8.04 | 8.04 |
| Mixed oxide blend: | | | | | | | | | | | | | |
| −325 mesh alumina particles | 21.66 | 21.66 | 21.66 | 21.66 | 21.66 | 21.66 | 21.66 | 28.33 | 28.33 | 28.33 | 28.33 | 28.33 | 28.33 |
| Finely divided ferric oxide (less than 2 micron size) | 1.14 | 1.14 | 1.14 | 1.14 | 1.14 | 1.14 | 1.14 | 1.49 | 1.49 | 1.49 | 1.49 | 1.49 | 1.49 |
| Strength-promoting agent: | | | | | | | | | | | | | |
| Particulate aluminum [c] | | 2.20 | 2.20 | 2.20 | 2.20 | 2.20 | 2.20 | | | | | | |
| Sodium silicate [d] | | 0.34 | 0.69 | 1.03 | 1.37 | 1.71 | 2.06 | | 1.54 | 1.41 | 1.24 | 1.45 | 1.43 |
| Total | 100.00 | 100.34 | 100.69 | 101.03 | 101.37 | 101.71 | 102.06 | 100.00 | 101.54 | 101.41 | 101.24 | 101.45 | 101.43 |

TABLE I.—Continued

| Formulation identification | 7 | U | V | W | X | Y | Z | AA | BB | CC | DD |
|---|---|---|---|---|---|---|---|---|---|---|---|
| Abrasive/phosphoric acid blend: | | | | | | | | | | | |
| No. 60-grit size silicon carbide | 62.79 | 62.79 | 62.79 | 62.79 | 62.79 | 72.90 | 72.90 | 72.90 | 72.90 | 72.90 | 72.90 |
| No. 60-grit size alumina | | | | | | | | | | | |
| No. 320-grit size silicon carbide | | | | | | | | | | | |
| No. 320-grit size alumina | | | | | | | | | | | |
| Phospholeum [b] | 7.07 | 7.07 | 7.07 | 7.07 | 7.07 | 5.60 | 5.60 | 5.60 | 5.60 | 5.60 | 5.60 |
| Mixed oxide blend: | | | | | | | | | | | |
| −325 mesh alumina particles | 28.63 | 28.63 | 28.63 | 28.63 | 28.63 | 18.62 | 18.62 | 18.62 | 18.62 | 18.62 | 18.62 |
| Finely divided ferric oxide (less than 2 micron size) | 1.51 | 1.51 | 1.51 | 1.51 | 1.51 | 0.98 | 0.98 | 0.98 | 0.98 | 0.98 | 0.98 |
| Strength-promoting agent: | | | | | | | | | | | |
| Particulate aluminum [c] | | | | | | 1.90 | 1.90 | 1.90 | 1.90 | 1.90 | 1.90 |
| Sodium silicate [d] | | 1.88 | 1.88 | 1.88 | 1.88 | 0.37 | 0.73 | 1.09 | 1.46 | 1.82 | 2.18 |
| Total | 100.00 | 101.88 | 101.88 | 101.88 | 101.88 | 100.37 | 100.73 | 101.09 | 101.46 | 101.82 | 102.18 |

[a] Parts by weight
[b] Registered trademark of Monsanto Chemical Company for a 105 percent phosphoric acid consisting essentially of an equilibrium mixture of about 58 percent by weight of orthophosphoric acid, 38 percent by weight of pyrophosphoric acid, 3.5 percent by weight of tripolyphosphoric acid, and a trace of higher polymer acids.
[c] 200-mesh aluminum powder, such as No. 123 aluminum powder of Alcoa Corporation.
[d] Aqueous sodium silicate employed:

| Examples | Percent solids | °Be | $SiO_2$ to $Na_2O$ wt. ratio | Such as |
|---|---|---|---|---|
| A through F, J through O, and Y through DD | 36–38 | 40–42 | 2.40 | 40–42° Be of the Sargent Company. |
| G through I, Q, and U through X | 42.9 | 47.0 | 2.90 | PQ silicate K of the Philadelphia Quartz Company. |
| P | 32.10 | 52.5 | 2.38 | No. 16 silicate (technical grade) of E. I. du Pont de Nemours and Company. |
| R | 32.05 | 35 | 3.75 | PQ silicate S-35 of the Philadelphia Quartz Company. |
| S | 37.60 | 41 | 3.22 | PQ silicate N of the Philadelphia Quartz Company. |
| T | 44.10 | 50.5 | 2.00 | PQ silicate D of the Philadelphia Quartz Company. |

In preparing the improved molding composition formulations tabulated in Table I, which contain the sodium silicate as the strength-promoting agent, care is used during application of the sodium silicate solution to the abrasive grit and the drying thereof to remove water to avoid agglomerating of grit particles into clusters. Generally and for most formulations the hydrated sodium silicate is added slowly to an agitated mass of the grit particles and agitation continued during a water removal by heating for several hours between 50° and 260°C. As illustrative of various useful mixing and drying techniques: in Formulation Example U, the hydrated sodium silicate is added while mixing the silicon carbide grit by means of a high speed bladed mixer means and then the sodium silicate-wetted grit is dried by tumbling while heated under infra-red lamps to about 140°F; in Formulation V, the same procedure is followed except the wetted and partially dried grit/-sodium silicate blend is dried still more by heating additionally at 500°F for 2 hours; in Formulation Example W, the hydrated sodium silicate is applied to and mixed with the silicon carbide grit under agitation, while a flame is directed onto the surface of the agitated grit; and in Formulation Example X, the grit is prewetted with a diluted hydrated sodium silicate, tumble dried by forcing heated air therethrough, and then ball milled for four minutes to break up agglomerates and clusters of the sodium silicate-coated grits.

Each of the molding composition's formulations in preceding Table I is processed by cold-pressing, precuring, and final curing to provide a useful abrasive body held together by a water-insoluble phosphate binder. In general this further processing includes pouring a precalculated weighed amount of molding composition into a suitable mold cavity and spreading it therein to a layer of relatively uniform thickness. The employed weighed amount of molding composition is that supplying an amount of abrasive grit particles precalculated on a volume basis to provide the particular abrasive grit loading desired in the cold-pressed interim abrasive body. Generally tool steel cylinders of appropriate inside diameter are employed for the mold in which to prepare wheel-like abrasive bodies, such as 3-inch thick grinding wheels having an O.D. of 18 inches and an I.D. of 14 inches. If desired, the surfaces of the mold, contacting the molding compositions, can be coated with a silicone mold release agent. The employed cold-pressing means is a hydraulic press for applying pressure to compact the molding composition to a predetermined stop providing a cold-pressed mass of the desired thickness. Following the cold pressing, the mass is precured and final cured. In most instances a standardized precure of 1 ½ to 2 hours at 170°F to 190°F is employed. The precure is accomplished by placing the cold-pressed mass in a preheated oven equipped with electrical resistance heating elements. The employed oven is cold at the initiation of the precuring of some compositions. In others the oven is at precure temperature when the cold-pressed mass is placed in the oven for precure.

Following precuring of the cold-pressed masses, each is finally cured. In most instances the heat in the oven is increased so that the precured mass heats at the rate of about 100°F per hour to 650°F; this 650°F temperature is held for about four hours; and then the cured body removed from the oven (or removed after allowing the oven to cool to a lower temperature as desired). In other instances, the precured mass has its temperature raised gradually, or in step-wise increments, at a rate no greater than 600°F per hour and usually at a rate of about 100°F per hour to a temperature of at least 600°F and, is held above this temperature for at least 2 hours. Higher final curing temperatures also are useful, but are not necessary to provide formation of a water-insoluble phosphate binder and an improved abrasive body of increased strength. Temperatures above about 1,200°F generally are avoided as abrasive bodies cured above that temperature are of no greater strength than are obtainable when the final curing is accomplished within the range of 600°F to 1200°F.

The following Table II tabulates strength data values for abrasive bodies prepared from each of the molding composition formulations presented in Table I. In some instances the bend strength of the abrasive body was determined and in other instances there was determined the abrasive body's diametrical tensile strength. From the strength data presented in Table II, it will be apparent that every employed improved molding composition formulation (e.g., those containing particulated aluminum and/or the sodium silicate) provided an abrasive body of significantly higher strength than the strength exhibited by the abrasive body prepared from the comparison formulation lacking the strength-promoting agent and otherwise most closely approximating the same molding composition formulation.

TABLE II.—ABRASIVE BODY

| From molding composition formulation | Abrasive grit (%/vol.) | Bend strength (psi) [a] | | Diametral tensile strength (psi) [b] | |
|---|---|---|---|---|---|
| | | Range | Av. | Range | Av. |
| (1) | 48 | 1030–1077 | 1060 | | |
| A | 48 | 1373–1455 | 1400 | | |
| B | 48 | 1557–1621 | 1580 | | |
| C | 48 | 1945–2152 | 2026 | | |
| (2) | 48 | 2082–2202 | 2145 | | |
| D | 48 | 2255–2348 | 2300 | | |
| E | 48 | 2801–3020 | 2900 | | |
| F | 48 | 3083–3242 | 3190 | | |
| (3) | 44 | | | 1120–1430 | 1280 |
| G | 44 | | | 1120–1890 | 1590 |
| H | 44 | | | 1810–2040 | 1850 |
| (4) | 44 | | | 1360–1580 | 1470 |
| I | 44 | | | 1620–2060 | 1870 |
| (5) | 48 | | est 960 | | |
| J | 48 | 1247–1408 | 1360 | | |
| K | 48 | 1681–1708 | 1690 | | |
| L | 48 | 1784–1869 | 1840 | | |
| M | 48 | 1835–1961 | 1910 | | |
| N | 48 | 1890–1977 | 1940 | | |
| O | 48 | 1961–2033 | 2000 | | |
| (6) | | | | 1160–1280 | 1230 |
| P | | | | 1650–1730 | 1700 |
| Q | | | | 1570–1680 | 1610 |
| R | | | | 1300–1600 | 1490 |
| S | | | | 1290–1580 | 1460 |
| T | | | | 1540–1720 | 1600 |
| (7) | | | | 1060–1640 | 1270 |
| U | | | | 1470–1670 | 1580 |
| V | | | | 1530–1670 | 1600 |
| W | | | | 1330–1480 | 1420 |
| X | | | | 1400–1720 | 1570 |
| Y | 48 | 2405–2705 | 2602 | | |
| Z | 48 | 2889–2980 | 2936 | | |
| AA | 48 | 2771–3028 | 2944 | | |
| BB | 48 | 2846–3099 | 2956 | | |
| CC | 48 | 2886–3051 | 2968 | | |
| DD | 48 | 2532–2961 | 2771 | | |

NOTES: Where a range of strength values are reported, the range is for a series of at least five prepared abrasive bodies, and the reported average is the mean arithmetical average of all bodies in the series.

[a] Determined Bend Strength = $\frac{3 \times \text{span} \times \text{observed break}}{2WT^2}$. $W$ = width; $T$ = thickness.

[b] Determined in substantial accordance with the teachings in *Materials Research and Standards*, April, 1963, pages 283–88.

Each of the abrasive bodies tabulated in Table II possesses adequate resistance to dissolution to water and like coolant solutions to be useful for known abrading purposes where such coolant solutions are used in contact with the abrasive body. As illustrative thereof, an abrasive body of Example Q, after soaking in water for ten days and then drying, has substantially the same tensile strength of about 1,600 psi as a like abrasive body not so treated, and also another abrasive body of Example Q, after water soaking and while thoroughly wetted, retained about 80 percent of its tensile strength in comparison to a like abrasive body not so treated.

While the invention has been described in detail and illustrated by specific examples herein, it will be apparent to those skilled in the art that some changes and modifications can be made thereof without departing from the true spirit and scope of the invention which is encompassed by the claims which follow.

We claim:

1. In a mixed cohesive molding composition for cold-pressing and subsequent heat-curing to become an article containing abrasive grit particles held together by a water-insoluble phosphate binder, comprising between an effective amount and up to 12 parts by weight of at least one strength-promoting agent selected from the group of particulate aluminum of less than 200 mesh size and sodium silicate, having a $SiO_2$ to $Na_2O$ weight ratio greater than 1 and less than 3.8, in each 100 parts by weight of said composition, from 90 to 30 parts by weight of abrasive grit particles selected from grit-size particles of alumina and silicon carbide, from 3 to 21 parts by weight of phosphoric acid, from 6 to 46 parts by weight of minus 325 mesh alumina particles, and finely divided ferric oxide in an amount of at least 0.4 parts by weight and up to about one-third the parts of the minus 325 mesh alumina particles.

2. The composition of claim 1 including the strength-promoting agent which is said particulate aluminum.

3. The composition of claim 1 including the strength-promoting agent which is said sodium silicate.

4. The composition of claim 1 including both said particulate aluminum and said sodium silicate as the strength-promoting agent.

5. An improved mixed cohesive molding composition for cold-pressing and subsequent heat-curing to become an article containing abrasive grit particles held together by a water-insoluble phosphate matrix, which composition for each 100 parts by weight thereof comprises:
   a. between 4 and 2.5 parts by weight of at least one strength-promoting agent selected from the group consisting of particulate aluminum of less than 200 mesh size and sodium silicate having a $SiO_2$ to $Na_2O$ weight ratio between 2.0 and 3.3;
   b. from 62 to 78 parts by weight of abrasive-grit particles selected from the group consisting of alumina and silicon carbide;
   c. from 11 to 6 parts by weight of phosphoric acid whose free water content constitutes less than 3 percent by weight of the composition;
   d. from 25 to 15 parts by weight of −325 mesh alumina particles; and
   e. from 2 to 1 parts by weight of less than 3 micron size ferric oxide particles.

6. The composition of claim 5 including the strength-promoting agent which is said particulate aluminum.

7. The composition of claim 5 including the strength-promoting agent which is said sodium silicate.

8. The composition of claim 5 including both said particulate aluminum and said sodium silicate as the strength-promoting agent.

9. An abrasive body comprised of:
   a. abrasive grit particles selected from the group consisting of grit-size particles of alumina and silicon carbide in an amount constituting from 30 to 60 percent by volume of said body; held together by
   b. a water-insoluble phosphate bonding matrix constituting at least 8 percent by volume of said body, which water-insoluble bonding matrix consists essentially of aluminum phosphates and a minor amount of iron phosphates intermingled therewith and includes a minor amount up to 10 percent by volume of at least one or of both of particulate aluminum of less than 200 mesh size and an in-situ formed phospho-silicate.

10. The body of claim 9 which contains the particulate aluminum.

11. The body of claim 9 which contains the phospho-silicate.

12. The body of claim 9 which contains both the particulate aluminum and the phospho-silicate.

* * * * *